United States Patent
Chen et al.

(10) Patent No.: US 9,082,158 B2
(45) Date of Patent: Jul. 14, 2015

(54) METHOD AND SYSTEM FOR REAL TIME STENT ENHANCEMENT ON LIVE 2D FLUOROSCOPIC SCENE

(71) Applicants: Terrence Chen, Princeton, NJ (US); Peter Durlak, Erlangen (DE); Markus Rossmeier, Bamberg (DE); Dorin Comaniciu, Princeton Junction, NJ (US)

(72) Inventors: Terrence Chen, Princeton, NJ (US); Peter Durlak, Erlangen (DE); Markus Rossmeier, Bamberg (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 193 days.

(21) Appl. No.: 13/759,170

(22) Filed: Feb. 5, 2013

(65) Prior Publication Data
US 2014/0079308 A1 Mar. 20, 2014

Related U.S. Application Data

(60) Provisional application No. 61/702,847, filed on Sep. 19, 2012.

(51) Int. Cl.
*G06K 9/00* (2006.01)
*G06T 5/00* (2006.01)
*G06T 5/50* (2006.01)
*A61B 5/05* (2006.01)

(52) U.S. Cl.
CPC . *G06T 5/00* (2013.01); *G06T 5/003* (2013.01); *G06T 5/50* (2013.01); *G06T 2207/10016* (2013.01); *G06T 2207/10121* (2013.01); *G06T 2207/20081* (2013.01); *G06T 2207/20221* (2013.01); *G06T 2207/30048* (2013.01); *G06T 2207/30052* (2013.01); *G06T 2207/30204* (2013.01)

(58) Field of Classification Search
USPC ......... 378/100, 103, 128–134, 154, 162, 168, 378/173, 181, 209, 232, 254, 274–276, 378/285–291, 305, 312, 6; 600/431, 424
See application file for complete search history.

(56) References Cited

U.S. PATENT DOCUMENTS

| | | | | |
|---|---|---|---|---|
| 6,532,380 B1 * | 3/2003 | Close et al. | | 600/431 |
| 7,792,342 B2 * | 9/2010 | Barbu et al. | | 382/128 |
| 7,970,191 B2 | 6/2011 | Georgescu et al. | | |
| 8,050,482 B2 * | 11/2011 | Barbu et al. | | 382/132 |
| 2010/0121181 A1 | 5/2010 | Wang et al. | | |
| 2011/0142318 A1 * | 6/2011 | Chen et al. | | 382/131 |
| 2011/0144480 A1 * | 6/2011 | Lu et al. | | 600/424 |
| 2011/0235876 A1 | 9/2011 | Pfister et al. | | |
| 2012/0093379 A1 | 4/2012 | Florent et al. | | |

* cited by examiner

*Primary Examiner* — Seyed Azarian

(57) ABSTRACT

A method and system for real time stent enhancement on a live 2D fluoroscopic scene is disclosed. A motion compensated stent enhancement image is generated from a first set of frames in a fluoroscopic image sequence. A weighting field is generated based on the motion compensated stent enhancement image. For each new frame in the fluoroscopic image sequence that is received, the stent is enhanced in the new frame by compounding the new frame with the motion compensated stent enhancement image using the weighting field.

27 Claims, 9 Drawing Sheets

METHOD AND SYSTEM FOR REAL TIME STENT ENHANCEMENT ON LIVE 2D FLUOROSCOPIC SCENE

This application claims the benefit of U.S. Provisional Application No. 61/702,847, filed Sep. 19, 2012, the disclosure of which is herein incorporated by reference.

BACKGROUND OF THE INVENTION

The present invention relates to stent enhancement in fluoroscopic images, and more particularly, to real time stent enhancement on a 2D fluoroscopic scene in order improve visualization of a stent during image-guided interventions.

Stent thrombosis and restenosis are associated with stent under-expansion, which has been shown to be a major risk factor for patients undergoing percutaneous coronary intervention (PCI). During such an intervention, a stent is deployed via a balloon at a location of a lesion inside the coronary artery. This procedure is typically monitored by X-ray fluoroscopy. However, the stent visibility is often low in the fluoroscopic images because the radiation is usually kept to a minimal level and stents are only slightly radiopaque in typical X-ray fluoroscopy. The low visibility of the stent undermines the assessment of the stent implantation outcome, which increases the risk of incomplete stent expansion. Although increasing signal to noise ratio by increasing radiation doses or using stents with radiopaque coatings may result in negative clinical effects, few viable alternative solutions are currently available.

The most reliable method to assess stent expansion is to observe the stent via intravascular Ultrasound (IVUS), in which an Ultrasound transducer is inserted into the target coronary artery via a catheter. However, IVUS requires an invasive procedure and is too expensive to be used by most current clinics in daily practice. Image processing techniques have been proposed to improve the image quality for better stent visibility, but such techniques provide only offline solutions for stent enhancement, which limits the usage of such techniques in clinical settings.

BRIEF SUMMARY OF THE INVENTION

The present invention provides a method and system for real time stent enhancement on a live 2D fluoroscopic scene. Embodiments of the present invention provide an online stent enhancement framework where a physician is able to see the enhanced stent live during an operation. The live scene remains unchanged other than the stent structure and produces no artifacts to potentially affect the diagnosis or perception of the physician. Embodiments of the present invention can also provide visualization of a stent in relation to the vessel wall when contrast medium is injected.

In one embodiment of the present invention, a motion compensated stent enhancement image is generated from a first set of frames in a fluoroscopic image sequence. A weighting field is generated based on the motion compensated stent enhancement image. A new frame in the fluoroscopic image sequence is received, and a stent is enhanced in the new frame by compounding the new frame with the motion compensated stent enhancement image using the weighting field.

These and other advantages of the invention will be apparent to those of ordinary skill in the art by reference to the following detailed description and the accompanying drawings.

DETAILED DESCRIPTION

The present invention relates to a method and system for real time stent enhancement on a live 2D fluoroscopic scene. Embodiments of the present invention are described herein to give a visual understanding of the stent enhancement. A digital image is often composed of digital representations of one or more objects (or shapes). The digital representation of an object is often described herein in terms of identifying and manipulating the object. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention provide an online stent enhancement framework where a physician is able to see the enhanced stent live during an operation. The live scene remains unchanged other than the stent structure and produces no artifacts to potentially affect the diagnosis or perception of the physician. According to an embodiment of the present invention, during live fluoroscopy, a first number of images (e.g., first 30 images) in the fluoroscopic image sequence are utilized to created an enhanced stent image by balloon marker based motion compensation. A location of the stent and the guidewire are then detected in the enhanced stent image. Based on this information, a smooth weighting field is generated using a Gaussian kernel. Using the weighting field, when each new live fluoroscopic image in the sequence is obtained, embodiments of the present invention detect a balloon marker pair in the live image, and then compound the enhanced stent with the live image using the balloon marker pair location as well as the weighting field. As a result, after the first number of images of the fluoroscopic image sequence, the physician performing an intervention procedure starts to see the stent clearly during the live intervention. Accordingly, assuming an acquisition rate of 15 frames per second, when the first 30 frames of the fluoroscopic image sequence are used to generate the enhanced stent image, the physician starts to see the enhanced stent on live frames 2 seconds after the fluoroscopic image sequence acquisition begins. The physician can also inject contrast medium in order to see the stent in relation to the vessel.

Figure 1:
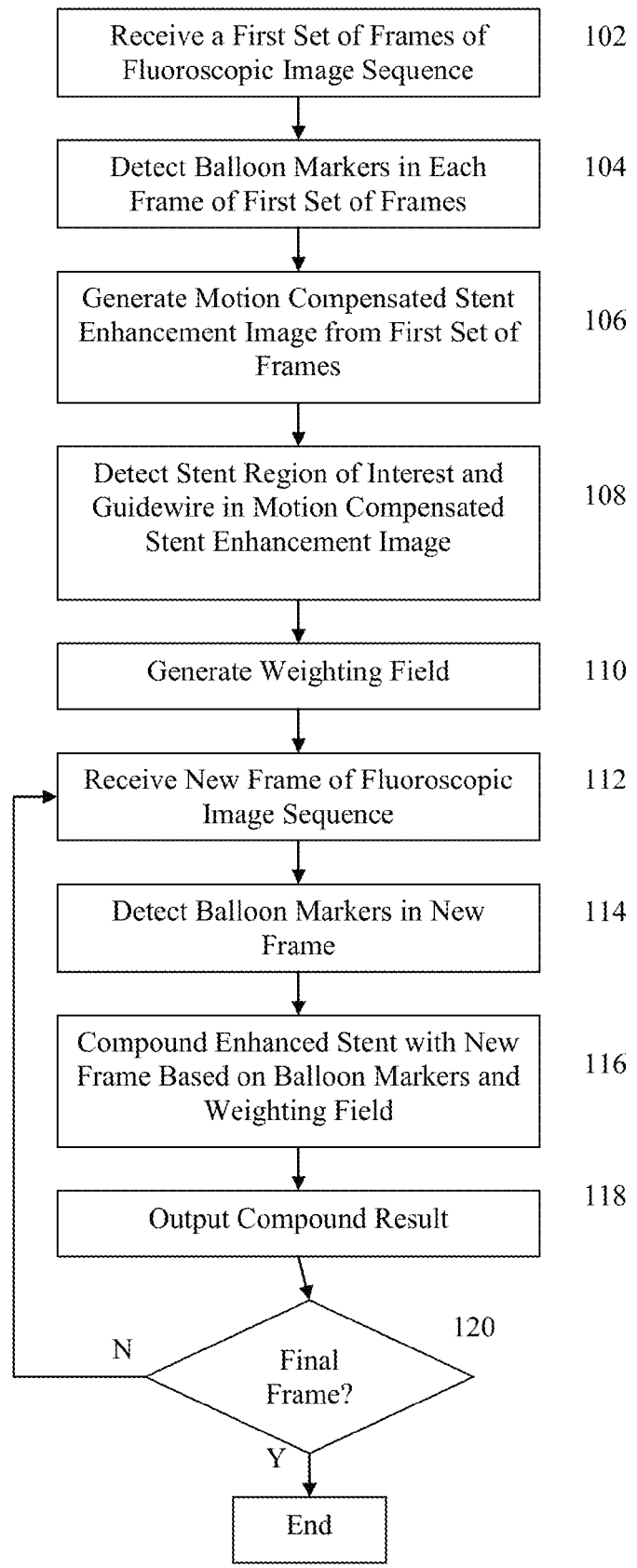
FIG. 1 illustrates a method of real time stent enhancement according to an embodiment of the present invention.

FIG. 1 illustrates a method of real time stent enhancement according to an embodiment of the present invention. The method of FIG. 1 transforms input fluoroscopic images in order to generate fluoroscopic images having an enhanced stent. As illustrated in FIG. 1, at step 102, a first set of frames of a fluoroscopic image sequence is received. The fluoroscopic image sequence is a sequence of 2D fluoroscopic (x-ray) images acquired over a time period. Each 2D fluoroscopic image in the sequence is referred to as a frame. The fluoroscopic image sequence can be received directly from an x-ray imaging device. In an advantageous embodiment, each frame of the fluoroscopic image sequence is received in real time as it is acquired by the x-ray imaging device. The first set of frames refers to a number of initial frames in the fluoroscopic image sequence. The first set of frames can include the first n frames acquired in the fluoroscopic image sequence. In an advantageous implementation, the first set of frames is the first 30 frames of the fluoroscopic image sequence, but the present invention is not limited thereto.

At step 104, a pair of balloon markers are detected in each frame of the first set of frames. Balloon markers are radiopaque markers at the proximal and distal ends of a stent. The pair of balloon markers is detected in each frame of the first set of frames, and the detected balloon markers can then be used to compensate for motion in the first set of frames.

It is possible to detect balloon markers individually, for example, using trained balloon marker detectors. However, balloon marker detection is prone to error due to false detections. In an intervention, there can be many marker-like patterns inside of a scene. In many cases, the ground truth balloon markers may not be among the top candidates detected for a frame. Therefore, existing methods for balloon marker detection rely heavily on the coherence and analysis along the temporal domain to remove false detections. Nevertheless, false detections can still exist in a cluttered scene with many blob-like structures. The ground truth that can be used to differentiate the real marker pair in a frame from other marker-like candidates is that there must be a guidewire connecting the real marker pair. Embodiments of the present invention utilize the fact that the true marker pair should be connected by the guidewire in order to remove false detections without temporal coherence. The joint probability learned from classifiers for the markers and the guidewire are more robust than the individual probability of marker detection. According to an advantageous embodiment, integrating the marker and wire probabilities through fusion leads to more robust marker detection results.

Figure 2:
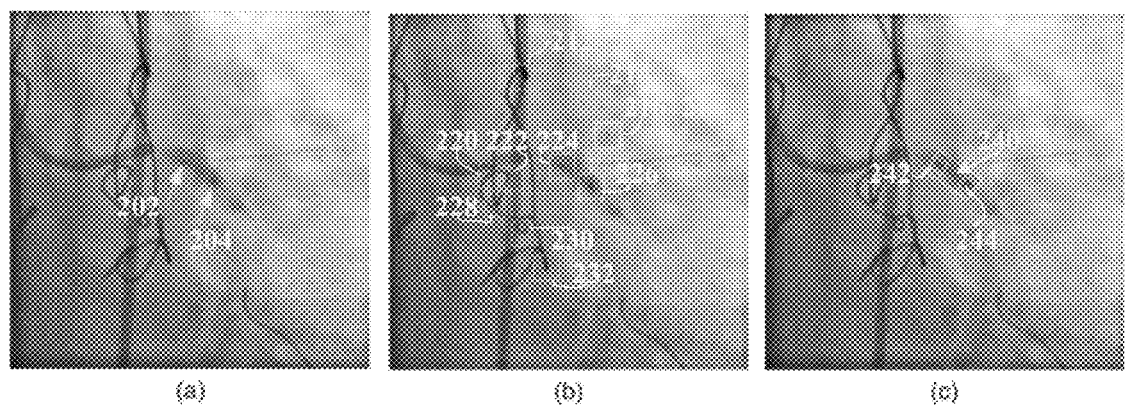
FIG. 2 illustrates detecting a pair of balloon markers using a joint context according to an embodiment of the present invention.

According to a possible embodiment, in order to obtain better balloon marker detection results, a classifier can be trained to detect a joint local context of the pair of markers. A trained balloon marker detector can be used to detect individual balloon marker candidates, and then the joint context classifier can combine the joint local context of each possible pair of candidates and select the best possible pair among all of the candidates based on their joint context. FIG. 2 illustrates detecting a pair of balloon markers using a joint context according to an embodiment of the present invention. Image (a) of FIG. 2 shows a ground truth balloon marker pair 202 and 204 in a fluoroscopic image. Image (b) shows balloon marker candidates 212, 214, 216, 218, 220, 222, 224, 226, 228, 230, and 232 detected by a trained balloon marker detector. Image (c) shows the joint context region 240 detected as having the highest probability by a trained joint context classifier, and the corresponding balloon marker pair 242 and 244. Although the above described joint context method can be used to detect the balloon markers, this method has some limitations. In particular, the stent between the two markers can deform wildly and outside of the joint context area, and the stent can be located in any major coronary with any type of background. Accordingly, it may de difficult to capture correct context information in the joint context area, and using such a scheme may lead to overfitting of the joint context classifier to the training data.

Figure 3:
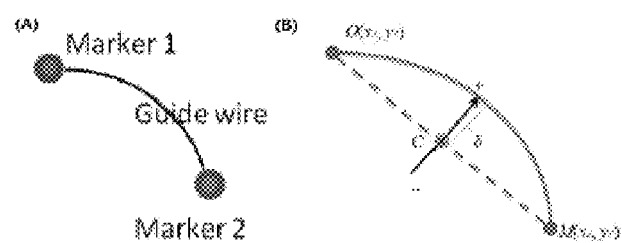
FIG. 3 illustrates a target detection model for detecting the balloon markers and the guidewire according to an embodiment of the present invention.

The only semantic ground truth is that both of the balloon markers must be located on the guidewire. According to an advantageous embodiment, the guidewire can be detected directly in each frame using a trained classifier that directly locates wire structures. FIG. 3 illustrates a target detection model for detecting the balloon markers and the guidewire according to an embodiment of the present invention. As shown in image (A) of FIG. 3, the target pattern to be detected is modeled as a marker pair connected by a thin guidewire. Because the balloon is covered by a stent inside the coronary and there is a limitation of the length of the stent, the degree of guidewire information is limited. As a result, the marker guidewire combination can be modeled as:

$$\chi(O, M, \delta) \tag{1}$$

where $O=(x1,y1)$, $M(x2,y2)$ are the locations of the two balloon markers, where $x1 \leq y1$, and $y1 \leq y2$ if $x1=x2$. $\delta$ is defined as the displacement along the normal direction from the center $$C = \frac{(O+M)}{2}$$

to the guidewire. These model parameters are illustrated in image (B) of FIG. 2. Given an image I, trained classifiers are used to detect the marker guidewire combination having the highest probability $P(O,M,\delta|I)$. The classifiers for detected this model can be trained in the fashion of marginal space learning (MSL), such that instead training a single classifier to detect the entire model directly, a series of classifiers are trained in marginal search spaces having increasing dimensionality. In particular, possible marker locations can be identified followed by the possible guidewire locations, and the over model probability determined as:

$$P(O,M,\delta|I) = P(O,M|I) P(\delta|O,M,I). \tag{2}$$

Figure 4:
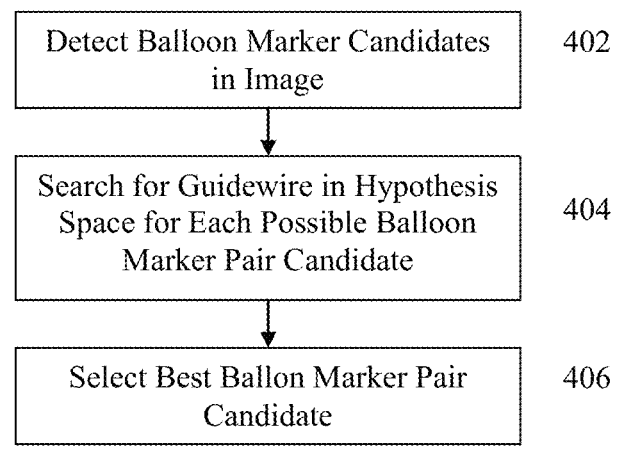
FIG. 4 illustrates a method of detecting a pair balloon markers in a fluoroscopic image according to an embodiment of the present invention.

FIG. 4 illustrates a method of detecting a pair balloon markers in a fluoroscopic image according to an embodiment of the present invention. The method of FIG. 4 detects the balloon marker pair using the balloon marker guidewire model described above. The method of FIG. 4 can be used to implement step 104 of FIG. 1. As illustrated in FIG. 4, at step 402, balloon marker candidates are detected using a trained balloon marker detector. The balloon marker candidate detection is formulated into a machine learning object detection framework to solve a two-class (object vs. background) classification problem. A box is used to scan through the image to extract candidate samples. Each sample is evaluated by a trained detector (classifier), which calculates a probability score representing the likelihood of being the target object. From another perspective, the marker candidate detection is the search of a parameter space. For individual markers, the location parameter space has two parameters, x and y. A box based representation is used to include both a marker and its context. Given an image, detection results using the trained balloon marker detector are consolidated into marker candidates having probability scores above a threshold.

Figure 5:
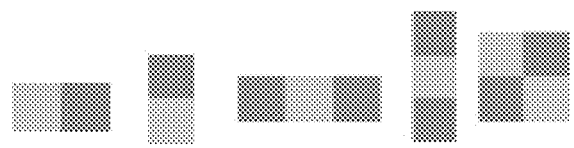
FIG. 5 illustrates examples of Haar wavelet-like features.

In an advantageous implementation, a probabilistic boosting tree (PBT) is used to train the balloon marker detector based on annotated training data. The detector is a tree-based structure with which the posterior probabilities of the presence of a marker are calculated from given image data. Therefore, the balloon marker detector not only provides a binary decision for a given image sample, but also a confidence value (score) associated with the decision. The nodes in the tree are constructed by a non-linear combination of simple classifiers using boosting techniques. Each of one or more detectors selects from a large pool of features a set of discriminative features that are used to distinguish the positive (target) samples in the training data from negative (background) samples in the training data. Different parameter spaces utilize different features calculated from image data. In an advantageous implementation, Haar wavelet-like features are used to train individual balloon marker detectors. FIG. 5 illustrates examples of Haar wavelet-like features. These features can be efficiently calculated using integral image-based techniques.

According to a possible embodiment, a bootstrapping strategy can be used to effectively remove same false detections. In this embodiment, the individual marker candidate detection is performed in two stages. In the first stage, a trained balloon marker detector is used to detect a first set of balloon marker candidates in an image. The first trained balloon marker detector is trained with target markers in the training data against randomly selected background samples in the training data. In the second stage, the detected first set of balloon marker candidates are processed by a second trained balloon marker detector to remove candidates incorrectly detected by the first trained balloon marker detector. The second trained balloon marker detector is trained with target markers in the training data against false positives detected by the first trained balloon marker detector in the training data. The first stage is used to quickly remove negatives and the second stage is aimed at pruning out more confusing or difficult cases. This two-stage approach results in more robust and efficient balloon marker candidate detection results.

Figure 6:
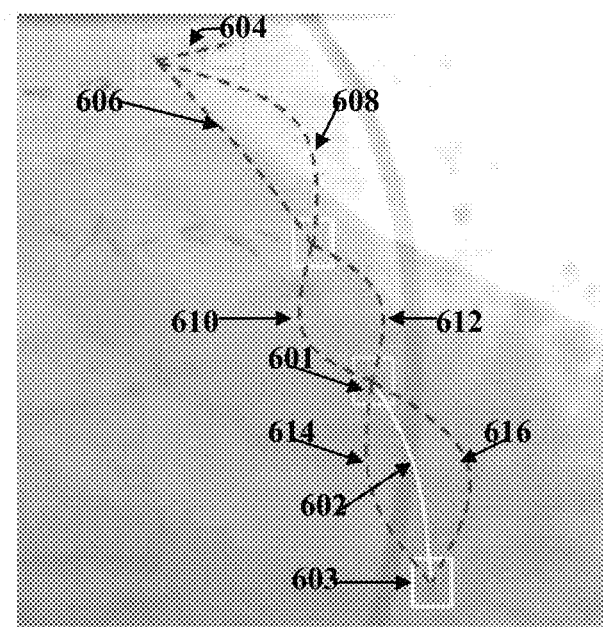
FIG. 6 illustrates exemplary positive and negative training samples for training the guidewire classifier.

Returning to FIG. 4, at step 404, a trained guidewire classifier is used to search for the guidewire in a hypothesis space for each possible pair of the detected balloon marker candidates. The guidewire can be modeled as a 2D cubic spline curve with three control points. The first control point is at O, the last control point is at M, and the location of the second control point is obtained through the parameter δ. Given the balloon marker candidates detected in each training image I, P(O,M|I) can be obtained from every possible pair of two balloon marker candidates. One positive sample and thousands of negative training samples can then be generated from training the guidewire classifier. FIG. 6 illustrates exemplary positive and negative training samples for training the guidewire classifier. As shown in FIG. 6, a positive sample 602 is generated as a spline curve which is located on the ground truth guidewire, and negative samples 604, 606, 608, 610, 612, 614, and 616 are spline curves between balloon markers other than the ground truth balloon marker pair 601 and 603 and spline curves between the ground truth balloon marker pair 601 and 603 other that are not located on the ground truth guidewire.

Figure 7:
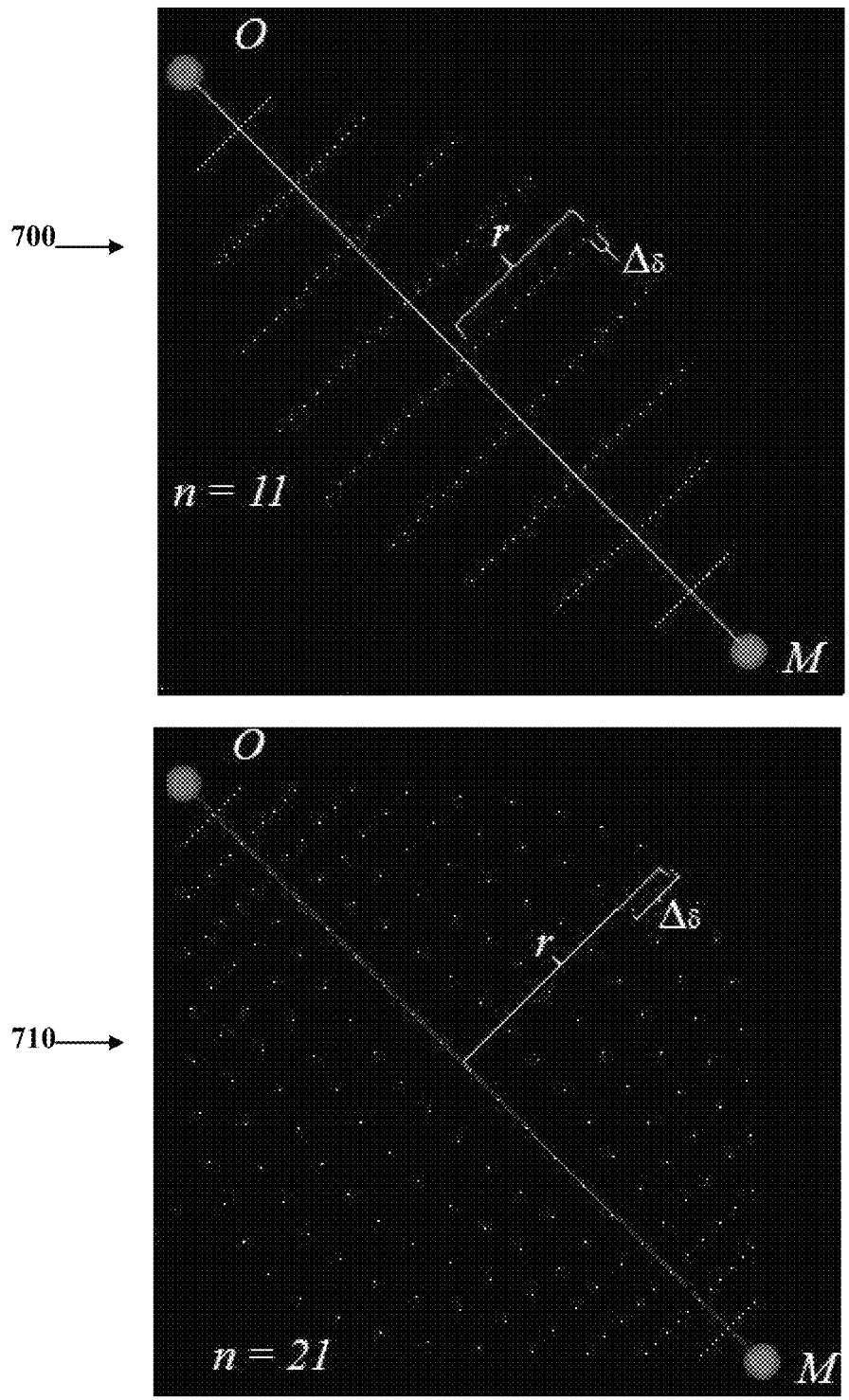
FIG. 7 illustrates examples of sampling in a hypothesis space between a pair of balloon marker candidates.

In order to search the spline parameter given a set of balloon marker candidates, the hypothesis space of δ can be discretized by a ratio defined by the Euclidean distance between the two balloon marker candidates, $d=\|O-M\|_{L_2}$. This results in the hypothesis space of δ of:

$$H_\delta=\{-r,-r+\Delta_\delta,-r+2\times\Delta_\delta,\ldots,0,\ldots,r-\Delta_\delta,r\}, \quad (3)$$

where $r=\alpha\times d$. α can be a predetermined value or can be a value learned from the training database. In an exemplary implementation learned from the training database used by the present inventors, $r=0.36\times d$. $\Delta_\delta$ is the search step size, which should be small enough to capture the ground truth guidewire at subpixel levels. In an exemplary implementation, $\Delta_\delta=0.15$ mm. In order to calculate features along the guidewire in the hypothesis space $H_\delta$ for a pair of balloon marker candidates, n points are sampled along the wire with equal arc length intervals, including the two marker candidates. In an exemplary implementation, n can be set to 41. FIG. 7 illustrates examples of sampling in a hypothesis space between a pair of balloon marker candidates. Images 700 and 710 of FIG. 7 show two sampling examples for the same O and M. The sampling example in image 700 has a larger n, smaller r, and smaller $\Delta_d$ with respect to the sampling example in image 710.

In a possible embodiment, the features used for training the guidewire classifier are steerable features extracted at the n sampling points along the wire model. The steerable features contain a number of gradient-derived variants, such as magnitude and angle with respect to certain pre-defined orientations with respect to the marker pair orientation. Calculation of such features is efficient, as it does not require image rotation or scaling. In addition, both magnitude and orientation output of steerable features are included in the feature pool.

In a given fluoroscopic image (e.g., a frame of the first set of frames), a set of balloon marker pair candidates can be defined as each possible pair of the detected balloon marker candidates. For each balloon marker pair candidate, the trained guidewire classifier extracts features (e.g., steerable features) at each of the n sampling points in the hypothesis space $H_\delta$ defined for that balloon marker candidate pair, and detects a spline having a highest probability $P(\delta|O,M,I)$ of being the guidewire for that balloon marker pair candidate.

Returning to FIG. 4, at step 406, the best balloon marker candidate pair is selected. A probability score $P(O,M,\delta|I)=P(O,M|I)\times P(\delta|O,M,I)$ of the combined balloon marker and guidewire model is determined for each balloon marker candidate pair. The balloon marker candidate pair having the highest combined probability score ($P(O,M|I)\times P(\delta|O,M,I)$) from the marker candidate detection and the guidewire detection is selected, resulting in detection of the pair of balloon markers in the fluoroscopic image.

Returning to FIG. 1, at step 106, a motion compensated stent enhancement image is generated from the first set of frames. The frames in the first set of frames are registered based on the detected balloon markers in each frame to compensate for motion between the frames. For example, one frame can be selected as a reference frame, and then each remaining frame in the set of first frames can be registered to the reference frame by calculating a transformation to best align the detected balloon markers with the detected balloon markers in the reference frame. The motion compensated stent enhancement image is then generated as a composite image of the registered frames in the first set of frames.

According to a possible implementation, a heuristic temporal coherence analysis algorithm may be applied to remove frames in which outlier balloon marker pairs are detected. The balloon marker pair and guidewire detection is performed on each frame of the first set of frames and $P_i(\chi)$ is the probability of the detected combined balloon marker pair and guidewire in frame i. A consistency score of each frame i in the first set of frames is then calculated as:

$$C_i = \frac{1}{N-1} \times \sum_{i,j,i \neq j} \exp\left(\frac{-d(i,j)^2}{\sigma^2}\right), \qquad (4)$$

where N is the total number of frames, i and j are indexes of two individual frames, and $d(i,j)=d_\alpha(i,j)+d_\beta(i,j)$ with the following definitions:

$$d_\alpha(i,j) = \|O_i - O_j\|_{L_2} + \|M_i - M_j\|_{L_2}, \qquad (5)$$

is the sum of distances between the two balloon markers in frame i and the respective balloon markers in frame j.

$$d_\beta(i,j) = \|\|O_i - M_i\|_{L_2} - \|O_j - M_j\|_{L_2}\|_{L_1}, \qquad (6)$$

is the length difference between the detected balloon marker pair $O_i, M_i$ in frame i and the detected balloon marker pair $O_j, M_j$ in frame j. A reference frame f is selected from the frames of the first set of frames based on the consistency scores and probability scores of the frames. In particular, the reference frame f is calculated as $\arg\max_i P_i \times C_i$. The detected balloon marker pair in the reference frame f is then compared to the detected balloon marker pair is each other frame in the first set of frames. For each frame k other than the reference frame f, if $d(f,k) > \tau$, the balloon marker detection results for frame k are considered an outlier and the frame k is not used to generate the motion compensated stent enhancement image. Each frame k that is not an outlier is registered to the reference frame f by aligning the detected balloon markers in frame k to the detected balloon markers in the reference frame f, and included in the composite image of the first set of frames resulting in the motion compensated stent enhancement image.

At step 108, a stent region of interest (ROI) and the guidewire are detected in the motion compensated stent enhancement image. The stent ROI is a bounding box of the enhanced stent that is detected in the motion compensated stent enhancement image. The bounding box of the enhanced stent can be estimated based on image information in the motion compensated stent enhancement image. In particular, machine learning based techniques, can be used to detect the bounding box of the enhanced stent. A marginal space learning (MSL) framework may be used to detect the bounding box of the enhanced stent. The idea of MSL is not to learn a classifier directly in the full similarity transformation space, but to incrementally learn classifiers in the series of marginal spaces having increasing dimensionality. As the dimensionality increases, the valid space region becomes more restricted by previous marginal space classifiers. The detection of the object (stent bounding box) is split into three steps: object position estimation, position-orientation estimation, and position-orientation-scale estimation. A separate classifier is trained based on annotated training data for each of these steps. Each classifier can be trained using a probabilistic boosting tree (PBT) in combination with Haar and/or steerable features based on a set of annotated training data. This results in the position, orientation, and scale parameters defining a bounding box representing the location of the stent in the motion compensated stent enhancement image. In a possible implementation, the search space in the motion compensated stent enhancement image for the initial stage (position detection) of the MSL based detection can be constrained based on the locations of the detected balloon markers.

In addition to detecting a bounding box (ROI) of the enhanced stent, the guidewire is localized in the motion compensated stent enhancement image. In a possible embodiment, the guidewire may be detected in the motion compensated stent enhancement image by searching a hypothesis space defined by the detected balloon markers in the motion compensated stent enhancement image using a trained guidewire classifier, as described above in connection with step 404 of FIG. 4. In this case, the guidewire classifier is trained using a database of annotated motion compensated stent enhancement images as the training data. The trained guidewire classifier searches the hypothesis space $H_\delta$ defined by the balloon markers in the motion compensated stent enhancement image and detects the spline with the highest probability $P(\delta|O,M,I)$ of being the guidewire. It is to be understood that the present invention is not limited to this particular technique for detecting the guidewire, and other techniques for detecting a guidewire in a fluoroscopic image may be used as well, such as the method described in U.S. Pat. No. 7,792,342, entitled "System and method for detecting and tracking a guidewire in a fluoroscopic image sequence", the disclosure of which is incorporated herein by reference.

At step 110, weighting field is generated. The weighting field is generated based on the ROI (bounding box) of the enhanced stent and the detected guidewire in the motion compensated stent enhancement image. In order to generate the weighting field, a Gaussian kernel G is applied to the points along the guidewire in the stent ROI (bounding box), resulting in a smooth weighting field W. The weighting field W is a matrix, in which each of its elements is a floating number between 0 and 1. The elements of the weighting field W represent a weighting of the stent enhancement image $I_s$ in relation to an original image I, when using the stent enhancement image $I_s$ to enhance the stent in the original image I. In particular, each element of the weighting field W corresponds to a pixel location and provides the weighting value for the corresponding pixel location in the enhanced stent image $I_s$. For pixel positions outside stent ROI, the weighting field W is set equal to zero.

At step 112, new frame of the fluoroscopic image sequence is received. The new frame is a frame in the fluoroscopic image sequence after the first set of frames, and can be received from the x-ray image acquisition device in real time as it is acquired, for example during an intervention procedure. Accordingly, the new frame provides a live fluoroscopic scene in real time.

At step 114, the balloon markers are detected in the new frame. The balloon markers can be detected in the new frame by detected the balloon marker pair using the method of FIG. 4, as described above.

At step 116, the enhanced stent image is compounded with the new frame based on the detected balloon markers in the new frame and the weighting field. The new frame is aligned with the motion compensated stent enhancement image generated from the first set of frames based on the detected balloon markers. In particular, the new frame can be registered to the stent enhancement image (or the stent enhancement image can be registered to the new frame) by calculating a transformation to best align the detected balloon markers in the new frame with the detected balloon markers in the stent enhancement image. Once the new frame and the stent enhancement image are aligned, the stent enhancement image $I_s$ and the new frame I are combined or blended using the weighting field W, resulting in a compound result O:

$$O = I_s \times W + I \times (1 - W). \qquad (7)$$

Since the weighting field W is equal to zero outside of the stent ROI, the view in the new frame I is unchanged in the compound result O outside of a region corresponding to the stent ROI. Within the stent ROI, the compound result O is more heavily weighted by the enhanced stent image $I_s$ based on the weighting field W, resulting in enhanced visualization of the stent in the compound result O, as compared with the new frame I prior to stent enhancement. As described above, the entire new frame and stent enhancement image are aligned based on the balloon markers and combined using the weighting field. It is also possible that only the stent ROI of the stent enhancement image be registered to the new frame based on the balloon markers in the stent enhancement image and the new frame, and then the stent ROI of the stent enhancement image be blended with a corresponding region of the new frame using the weighting field. Since the weighting field is equal to zero outside of the stent ROI, this would result in substantially the same compound result O as when the entire new frame and stent enhancement image are combined.

Figure 8:
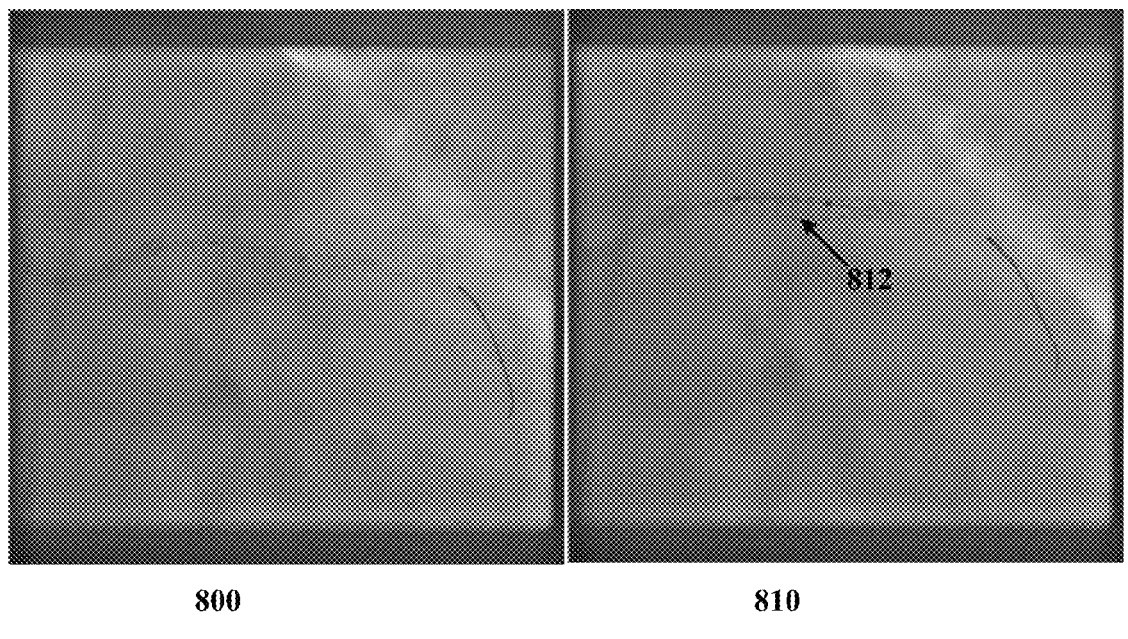
FIG. 8 illustrates exemplary stent enhancement results in a fluoroscopic image.

At step 118, the compound result generated by combining the new frame and the motion compensated stent enhancement image using the weighting field is output. The compound result provides an enhanced visualization of the stent, while providing a view that is same as the new frame outside of a stent region of interest. The compound result can be output by displaying the compound result, for example on a display device of a computer system. It is to be understood that steps 114-118 can be performed in real time for a new frame as the new frame is received from an x-ray image acquisition device. Accordingly, outputting the compound result provides live stent enhancement in real time to the scene in the new frame of the fluoroscopic image sequence. For example, such live stent enhancement can be used during an intervention procedure. FIG. 8 illustrates exemplary stent enhancement results in a fluoroscopic image. As shown in FIG. 8, image 800 shows an original scene in a fluoroscopic image and image 810 shows a compound result image providing live (real time) stent enhancement to the scene shown in image 800. As shown in image 810, the visibility of the stent 812 has been greatly enhanced in the stent enhanced live scene, as compared to original scene shown in image 800.

Returning to FIG. 1, at step 120, it is determined if the new frame is the final frame in the fluoroscopic image sequence. If the frame is the final frame in the fluoroscopic image sequence, the method ends. If the frame is not the final frame in the fluoroscopic image sequence, the method returns to step 112, and the next new frame is received. Steps 112-118 are then repeated in real time for each new frame acquired in the fluoroscopic image sequence, thus providing a live enhanced stent scene for each new frame received. Accordingly, the method of FIG. 1 can provide real time stent enhancement during an intervention procedure.

Figure 9:
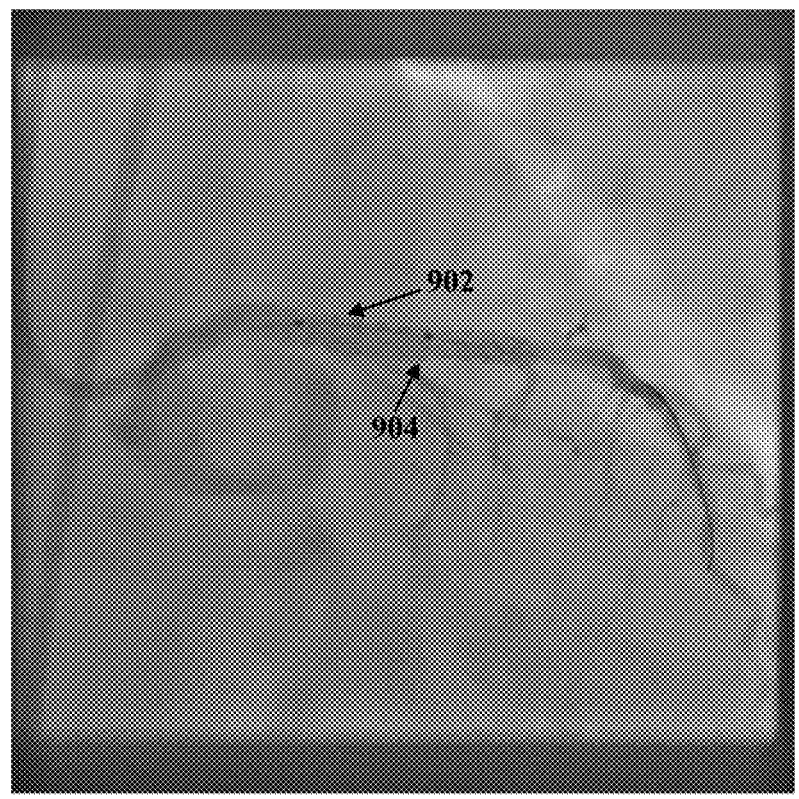
FIG. 9 illustrates an example of stent enhancement on a fluoroscopic image with contrast injection.

At any point during an intervention procedure, a contrast medium can be injected by the physician. The contrast medium increases the contrast of the blood flowing through the vessels in order to visualize the vessels in the fluoroscopic images. Accordingly, when contrast is injected and the method of FIG. 1 is performed, the enhanced stent can be seen in the contrast-enhanced frames of the fluoroscopic image sequence in order to visualize the stent in relation with the contrast-enhanced vessels. FIG. 9 illustrates an example of stent enhancement on a fluoroscopic image with contrast injection. As shown in FIG. 9, the relationship between the enhanced stent 902 and the contrast-enhanced vessels 904 can be seen.

Figure 10:
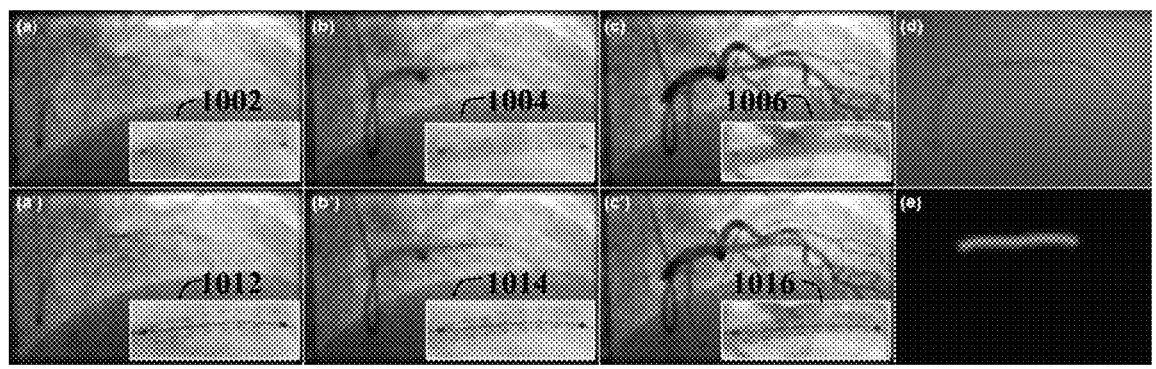
FIG. 10 illustrates exemplary results of real time stent enhancement on a fluoroscopic image sequence.

FIG. 10 illustrates exemplary results of real time stent enhancement on a fluoroscopic image sequence. As shown in FIG. 10, images (a), (b), and (c) are original frames of a fluoroscopic images sequence. Images 1002, 1004, and 1006 are zoomed in views of the of stent regions of frames (a), (b), and (c), respectively. Image (d) shows an enhanced stent image obtained using the first 30 frames of the fluoroscopic image sequence. Image (e) is the weighting field W generated from the enhanced stent image shown in image (d). Images (a)', (b)', and (c)' shows compound images resulting from blending the enhanced stent image shown in image (d) with each of the original frames (a), (b), and (c), respectively, using the weighting field shown in image (e). Images 1012, 1014, and 1016 are zoomed in views of the stent regions of compound result images (a)', (b)', and (c)'.

Figure 11:
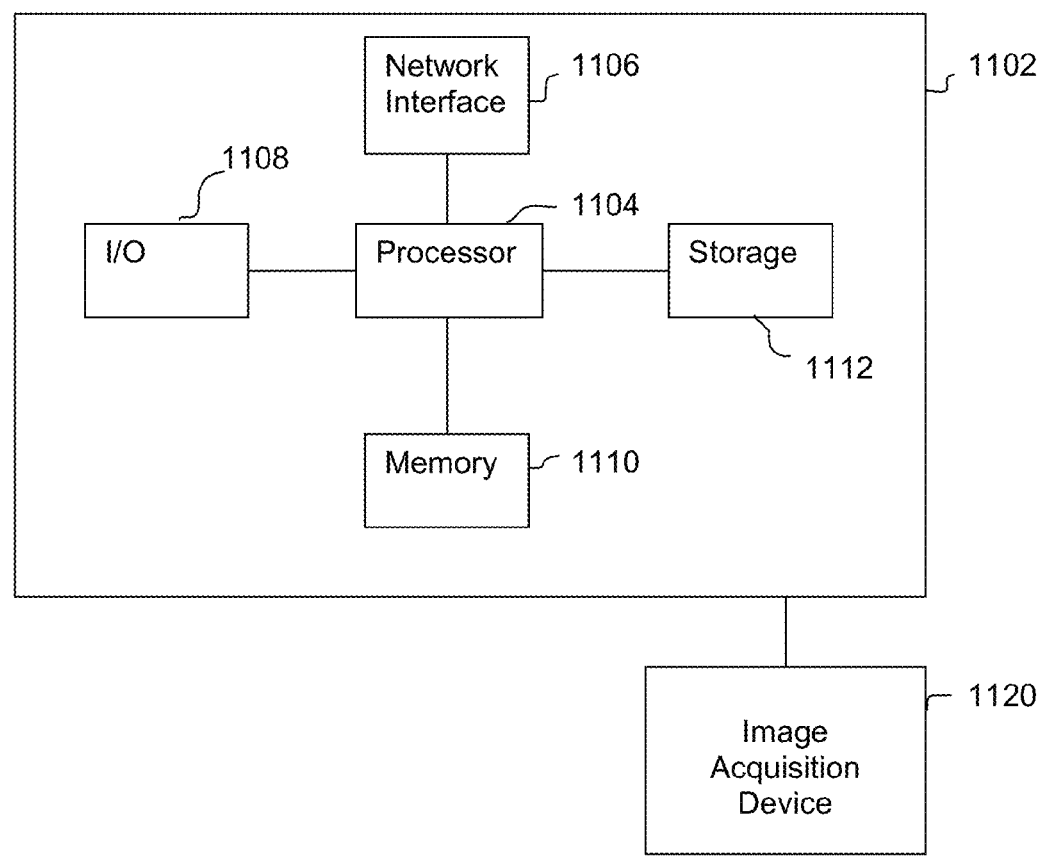
FIG. 11 is a high level block diagram of a computer capable of implementing the present invention.

The above-described methods for real time stent enhancement in a fluoroscopic image sequence may be implemented on a computer using well-known computer processors, memory units, storage devices, computer software, and other components. A high level block diagram of such a computer is illustrated in FIG. 11. Computer 1102 contains a processor 1104 which controls the overall operation of the computer 1102 by executing computer program instructions which define such operation. The computer program instructions may be stored in a storage device 1112, or other computer readable medium, (e.g., magnetic disk) and loaded into memory 1110 when execution of the computer program instructions is desired. Thus, all method steps described above, including the method steps of FIGS. 1 and 4, may be defined by the computer program instructions stored in the memory 1110 and/or storage 1112 and controlled by the processor 1104 executing the computer program instructions. An image acquisition device 1120, such as an X-ray imaging device, can be connected to the computer 1102 to input fluoroscopic image sequences to the computer 1102. It is possible to implement the image acquisition device 1120 and the computer 1102 as one device. It is also possible that the image acquisition device 1120 and the computer 1102 communicate wirelessly through a network. The computer 1102 also includes one or more network interfaces 1106 for communicating with other devices via a network. The computer 1102 also includes other input/output devices 1108 that enable user interaction with the computer 1102 (e.g., display, keyboard, mouse, speakers, buttons, etc.) One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of stent enhancement in a fluoroscopic image sequence, comprising:
    generating a motion compensated stent enhancement image from a first set of frames in a fluoroscopic image sequence;
    generating a weighting field based on the motion compensated stent enhancement image;
    receiving a new frame in the fluoroscopic image sequence; and enhancing a stent in the new frame by compounding the new frame with the motion compensated stent enhancement image using the weighting field.

2. The method of claim 1, wherein the generating a motion compensated stent enhancement image from a first set of frames in a fluoroscopic image sequence comprises:
    detecting a pair of balloon markers in each frame of the first set of frames in the fluoroscopic image sequence;
    aligning the first set of frames based on the detected pair of balloon markers in each frame of the first set of frames; and
    generating the motion compensated stent enhancement image as a composite image of the aligned first set of frames.

3. The method of claim 2, wherein the detecting a pair of balloon markers in each frame of the first set of frames in the fluoroscopic image sequence comprises:
    detecting individual balloon marker candidates in each frame of the first set of frames using a trained balloon marker detector;
    determining a number of balloon marker pair candidates in each frame from the detected individual balloon marker candidates in each frame;
    detecting, in a respective hypothesis space defined by each respective balloon marker pair candidate in each frame, a spline representing a guidewire using a trained guidewire classifier; and
    selecting one of the balloon marker pair candidates in each frame based on probability scores from the trained balloon marker detector and the trained guidewire classifier.

4. The method of claim 2, wherein the aligning the first set of frames based on the detected pair of balloon markers in each frame of the first set of frames comprises:
    calculating a consistency score of each frame in the first set of frames based on the detected pair of balloon markers in each frame of the first set of frames;
    selecting a reference frame of the first set of frames based on the consistency score and a detection probability of the detected pair of balloon markers in each frame of the first set of frames;
    for each frame of the first set of frames other than the reference frame, calculating a distance measure between the detected pair of balloon markers in that frame and the detected pair of balloon markers in the reference frame; and
    removing a frame from the first set of frames if the distance measure calculated for the frame is greater than a threshold; and
    registering each remaining frame of the first set of frames to the reference frame based on the detected balloon markers in that frame and the detected balloon markers in the reference frame.

5. The method of claim 2, wherein the generating a weighting field based on the motion compensated stent enhancement image comprises:
    detecting a stent region of interest in the motion compensated stent enhancement image;
    detecting a guidewire in the motion compensated stent enhancement image; and
    generating the weighting field by applying a Gaussian kernel to points along the detected guidewire in the detected stent region of interest in the motion compensated stent enhancement image.

6. The method of claim 5, wherein the detecting a stent region of interest in the motion compensated stent enhancement image comprises:
    detecting a bounding box of a stent in the motion compensated stent enhancement image using marginal space learning based detection.

7. The method of claim 5, wherein the detecting a guidewire in the motion compensated stent enhancement image comprises:
    detecting a guidewire in a hypothesis space defined by the pair of balloon markers in the motion compensated stent enhancement image using a trained guidewire classifier.

8. The method of claim 5, wherein the enhancing a stent in the new frame by compounding the new frame with the motion compensated stent enhancement image using the weighting field comprises:
    detecting a pair of balloon markers in the new frame;
    aligning the new frame and the motion compensated stent enhancement image based on the detected pair of balloon markers in the new frame and the pair of balloon markers in the motion compensated stent enhancement image; and
    generating a compound image that is a weighted combination of the aligned new frame and the motion compensated stent enhancement image weighted based on the weighting field.

9. The method of claim 8, wherein the generating a compound image that is a weighted combination of the aligned new frame and the motion compensated stent enhancement image weighted based on the weighting field comprises:
    generating the compound image O as $O = I_s \times W + I \times (1-W)$, where $I_s$ is the motion compensated stent enhancement image, I is the aligned new frame, and W is the weighting field.

10. The method of claim 1, further comprising:
    repeating the steps of receiving a new frame and enhancing a stent in the new frame for each of a plurality of new frames in the fluoroscopic image sequence.

11. The method of claim 10, wherein the step of enhancing a stent in the new frame is performed in real time for each of the plurality of new frames as each of the plurality of new frames is received.

12. The method of claim 1, wherein the first set of frames comprises a first number of frames in the fluoroscopic image sequence.

13. The method of claim 12, wherein the first set of frames comprises a first 30 frames in the fluoroscopic image sequence.

14. An apparatus for stent enhancement in a fluoroscopic image sequence, comprising:
    means for generating a motion compensated stent enhancement image from a first set of frames in a fluoroscopic image sequence;
    means for generating a weighting field based on the motion compensated stent enhancement image; and
    means for compounding a new frame of the fluoroscopic image sequence with the motion compensated stent enhancement image using the weighting field.

15. The apparatus of claim 14, wherein the means for generating a motion compensated stent enhancement image from a first set of frames in a fluoroscopic image sequence comprises:
    means for detecting a pair of balloon markers in each frame of the first set of frames in the fluoroscopic image sequence;
    means for aligning the first set of frames based on the detected pair of balloon markers in each frame of the first set of frames; and means for generating the motion compensated stent enhancement image as a composite image of the aligned first set of frames.

16. The apparatus of claim 15, wherein the means for generating a weighting field based on the motion compensated stent enhancement image comprises:
    means for detecting a stent region of interest in the motion compensated stent enhancement image;
    means for detecting a guidewire in the motion compensated stent enhancement image; and
    means for generating the weighting field from points along the detected guidewire in the detected stent region of interest in the motion compensated stent enhancement image.

17. The apparatus of claim 15, wherein the means for compounding a new frame of the fluoroscopic image sequence with the motion compensated stent enhancement image using the weighting field comprises:
    means for detecting a pair of balloon markers in the new frame;
    means for aligning the new frame and the motion compensated stent enhancement image based on the detected pair of balloon markers in the new frame and the pair of balloon markers in the motion compensated stent enhancement image; and
    means for generating a compound image that is a weighted combination of the aligned new frame and the motion compensated stent enhancement image weighted based on the weighting field.

18. A non-transitory computer readable medium storing computer program instructions for stent enhancement in a fluoroscopic image sequence, the computer program instructions when executed by a processor cause the processor to perform operations comprising:
    generating a motion compensated stent enhancement image from a first set of frames in a fluoroscopic image sequence;
    generating a weighting field based on the motion compensated stent enhancement image;
    receiving a new frame in the fluoroscopic image sequence; and
    enhancing a stent in the new frame by compounding the new frame with the motion compensated stent enhancement image using the weighting field.

19. The non-transitory computer readable medium of claim 18, wherein the generating a motion compensated stent enhancement image from a first set of frames in a fluoroscopic image sequence comprises:
    detecting a pair of balloon markers in each frame of the first set of frames in the fluoroscopic image sequence;
    aligning the first set of frames based on the detected pair of balloon markers in each frame of the first set of frames; and
    generating the motion compensated stent enhancement image as a composite image of the aligned first set of frames.

20. The non-transitory computer readable medium of claim 19, wherein the detecting a pair of balloon markers in each frame of the first set of frames in the fluoroscopic image sequence comprises:
    detecting individual balloon marker candidates in each frame of the first set of frames using a trained balloon marker detector;
    determining a number of balloon marker pair candidates in each frame from the detected individual balloon marker candidates in each frame;
    detecting, in a respective hypothesis space defined by each respective balloon marker pair candidate in each frame, a spline representing a guidewire using a trained guidewire classifier; and
    selecting one of the balloon marker pair candidates in each frame based on probability scores from the trained balloon marker detector and the trained guidewire classifier.

21. The non-transitory computer readable medium of claim 19, wherein the generating a weighting field based on the motion compensated stent enhancement image comprises:
    detecting a stent region of interest in the motion compensated stent enhancement image;
    detecting a guidewire in the motion compensated stent enhancement image; and
    generating the weighting field by applying a Gaussian kernel to points along the detected guidewire in the detected stent region of interest in the motion compensated stent enhancement image.

22. The non-transitory computer readable medium of claim 21, wherein the detecting a stent region of interest in the motion compensated stent enhancement image comprises:
    detecting a bounding box of a stent in the motion compensated stent enhancement image using marginal space learning based detection.

23. The non-transitory computer readable medium of claim 21, wherein the detecting a guidewire in the motion compensated stent enhancement image comprises:
    detecting a guidewire in a hypothesis space defined by the pair of balloon markers in the motion compensated stent enhancement image using a trained guidewire classifier.

24. The non-transitory computer readable medium of claim 21, wherein the enhancing a stent in the new frame by compounding the new frame with the motion compensated stent enhancement image using the weighting field comprises:
    detecting a pair of balloon markers in the new frame;
    aligning the new frame and the motion compensated stent enhancement image based on the detected pair of balloon markers in the new frame and the pair of balloon markers in the motion compensated stent enhancement image; and
    generating a compound image that is a weighted combination of the aligned new frame and the motion compensated stent enhancement image weighted based on the weighting field.

25. The non-transitory computer readable medium of claim 24, wherein the generating a compound image that is a weighted combination of the aligned new frame and the motion compensated stent enhancement image weighted based on the weighting field comprises:
    generating the compound image O as $O = I_s \times W + I \times (1-W)$, where $I_s$ is the motion compensated stent enhancement image, I is the aligned new frame, and W is the weighting field.

26. The non-transitory computer readable medium of claim 18, wherein the operations further comprise:
    repeating the operations of receiving a new frame and enhancing a stent in the new frame for each of a plurality of new frames in the fluoroscopic image sequence.

27. The non-transitory computer readable medium of claim 26, wherein the operation of enhancing a stent in the new frame is performed in real time for each of the plurality of new frames as each of the plurality of new frames is received.

* * * * *